United States Patent

[11] 3,593,834

[72] Inventors Zbigniew Zygmunt Klos;
 Lech Stanislaw Bialkowski, both of Warsaw, Poland
[21] Appl. No. 864,305
[22] Filed Oct. 3, 1969
[45] Patented July 20, 1971
[73] Assignee Biuro Studiow i Projektow Konstrukcji Stalowych Mostostal Warsaw, Poland
[32] Priority Oct. 4, 1968
[33] Poland
[31] P. 129366

[54] CONVEYOR FOR HANDLING FROZEN PRODUCTS
4 Claims, 6 Drawing Figs.
[52] U.S. Cl. .................................................. 198/1, 259/54
[51] Int. Cl. .................................................. B65g, B01f 11/00
[50] Field of Search. .................................................. 198/219, 106, 107, 129, 189, 195; 62/374; 259/54, 72

[56] References Cited
UNITED STATES PATENTS
3,289,610  12/1966  Lounsbury et al. ............ 259/54 X

*Primary Examiner*—Harvey C. Hornsby
*Assistant Examiner*—Alfred N. Goodman
*Attorney*—Stevens, Davis, Miller & Mosher ABSTRACT: The invention concerns a conveyor for handling food products which utilizes vertical, alternately disposed, stationary and vertically moving bars. The ends of the stationary moving bars are secured to vertical plates which in turn are secured to a Gall-type power transmission chain driven by a gear wheel. The moving bars pass through vertical plates and are received on either side in the slots of guides which are moved in vertical directions by a multiple-lob cam which cam is mounted on the same shaft on which the gear wheel driven by the power transmission chain is mounted.

3,593,834

CONVEYOR FOR HANDLING FROZEN PRODUCTS

This invention relates to conveyor for handling products in food freezers. Said conveyor shifts food products in the direction from a freezer feed funnel to the discharge point of the freezer in such a time as necessary to ensure complete product freezing, during which time the small freezing parts of the product are set into vertical and horizontal motion to prevent lumping of these parts and their freezing onto the conveyor surface.

As hitherto, net belts, vibrating troughs, fluidization beds or inclined plates have been in use in the freezers to move food products.

A feature common for all these types of product-handling equipment is that the individual parts of the product do move in one plane only and so they show tendency to freeze on to the conveyor surface and to clot, thus requiring consequential mechanical separation of the frozen lumps which fact adversely influences the quality of the product and involves more labor.

The object of this invention is to obviate the lumping effect when the product passes through the process of refrigeration, which object can be achieved by continuous separation of individual parts shifting the same in two planes, i.e. the horizontal and vertical planes.

In the freezing chamber of the freezer, products designed for being frozen are passed over by a stream of cold air generated in evaporators and directed by fans upon the moving conveyors carrying the products. The upper conveyor is made up of fixed bars disposed transversely to its motion, and of moving bars operating in the vertical direction. The fixed stationary bars are mounted at their both ends in upper portions of plates, whose lower portions are, in turn, fastened by bolts to the articulated joints of the Gall-type driving chain.

This chain is moved by two gear wheels mounted on horizontal shafts disposed in two opposite ends of the freezer.

Through the vertical openings made in the upper plate portions and disposed between stationary bars there pass moving bars whose ends are travelling in guides fitted to the horizontal beams pushed in the upward and downward directions by the multiple-lobe cams mounted on the same shafts on which are mounted the toothed wheels driven by the power transmission chain.

As for guides piloting the moving bars, these consist of two vertical beams transversely connected to each other by two straight line horizontal rods fitted to said beams by way of articulation. One of these beams has a roller attached thereto from underneath and driven by the multiple-lobe cam revolving along with the toothed wheel driven by the power transmission chain of the conveyor.

Beneath the bar conveyor provision is made for another conveyor, built in the known manner and serving the purpose of refrigerating those products which are exposed to the threat of being lumped when taking part in the freezing process.

The described development of the frozen-product conveyor is especially advantageous in that the small parts, or particles, of the product handled are continually set in vertical or horizontal motion thus incessantly changing their previous positions. This mode of handling frozen products prevents small parts of these products from freezing onto the conveyor and from clotting, and so no consequential need arises for any repeated size reduction after the freezing process, which operation might otherwise easily impair the product handled.

The new development according to the invention is presented in an exemplary embodiment by way of reference to the accompanying drawings, where:

Figure 1:
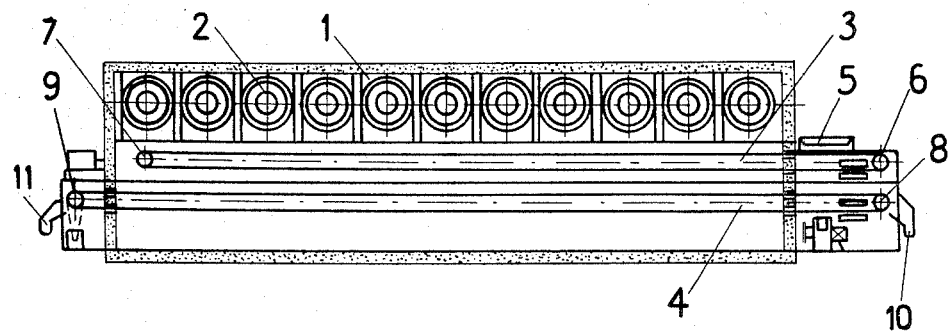
FIG. 1 shows the longitudinal cross-sectional view of the freezer chamber.
Figure 2:
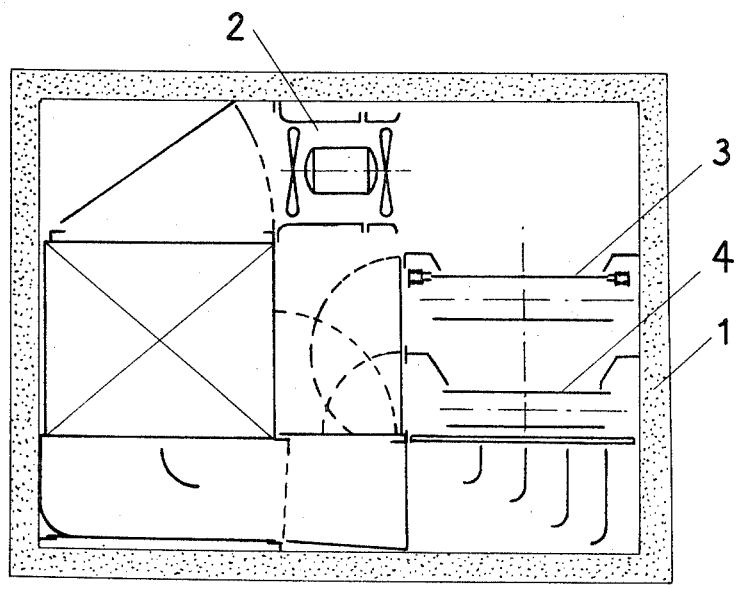
FIG. 2 shows the transverse cross-sectional view of the same freezer.

In the chamber of the freezer, enclosed by insulating walls 1, the stream of cooled air is directed via fans 2 upon conveyors 3 and 4 which carry the products subjected to the process of refrigeration. Said products are delivered to conveyor 3 by a vibrating feeder 5 installed outside the freezer. Conveyor 3 is driven by gear wheels 6 and 7, whereas conveyor 4 is moved by wheels 8 and 9. Conveyor 3 is provided to dislocate products handled from right to left when looking at FIG. 1, whereafter said products fall upon conveyor 4 which last conveyor shifts same in the direction of the external chute 10.

Products not suspect of having their particles exposed to the risk of agglomeration during the process of refrigeration do not require such a long travel, and may be directly passed onto the conveyor 4 which conveyor under such circumstances moves from the right to the left-hand side discharging products handled via the way of chute 11.

Figure 3:
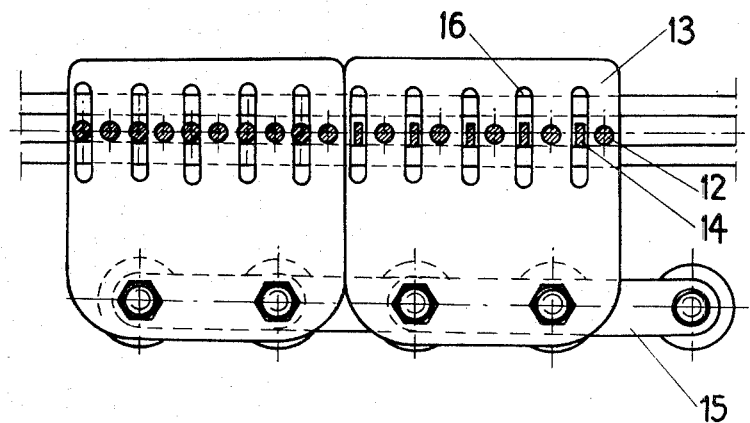
FIG. 3 shows the side view of the power transmission chain with plates fitted thereto, which shields carry the attached ends of the stationary, fixed conveyor bars.
Figure 4:
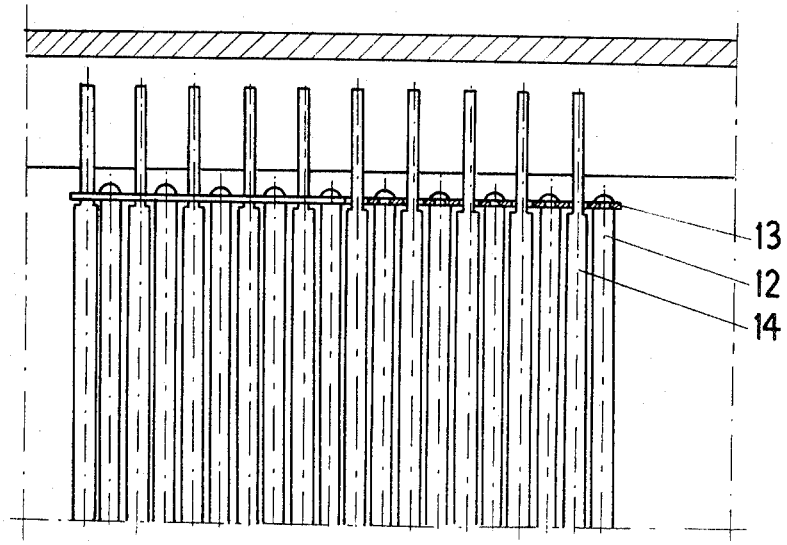
FIG. 4 shows the top view of the conveyor components in the form of stationary and moving bars.
Figure 5:
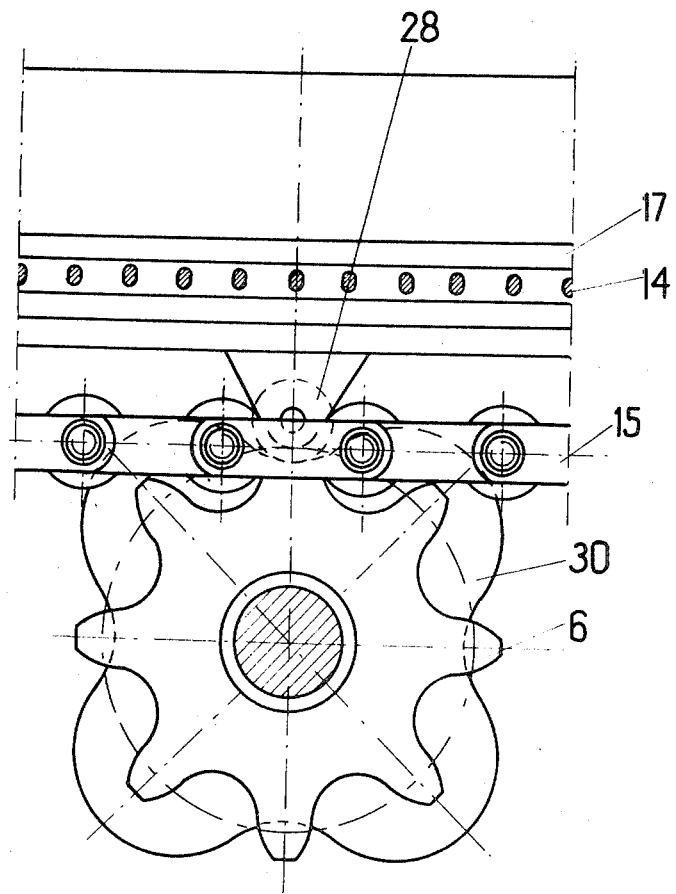
FIG. 5 shows the side view of the power transmission chain along with its driving gear, multiple-lobe cam and guide, the latter actuating the moving bars.
Figure 6:
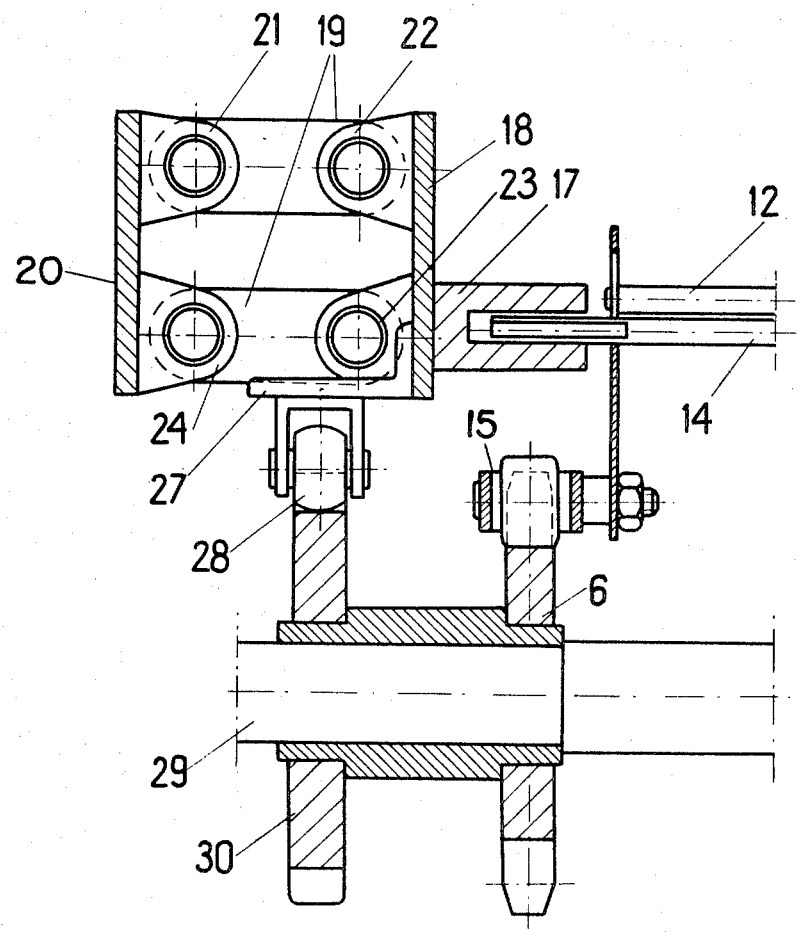
FIG. 6 shows components of the arrangement illustrated by FIG. 5, in their cross-sectional view.

The upper conveyor 3 is designed as an oscillating unit, and consists of the stationary bars 12 secured in the plates 13 which are bolted down to the articulated joints of the power transmission chain 15, and of moving bars 14 which last bars pass through the vertical openings 16 made in said plates 13 (FIGS. 3 and 4). The moving bars 14 are shifted, as seen from FIGS. 5 and 6, in guides 17 which last guides are secured to the vertical beam 18, which beam is disposed inwardly in relation to the conveyor. Said guide consists of two horizontal beams 18 and 20, mutually interconnected by means of articulated joints 21, 22, 23 and 24 and horizontal straight line rods 19.

Beam 18 carries angle bar 27 duly fitted thereto along with roller 28.

The shaft 29 carrying the toothed wheel 6 driven by the power transmission chain 15 has also inserted a multiple-lobe cam 30 which rotating along with the shaft 29 imparts vertical motion to the guide 17 and thus also to the moving bars 14 of the conveyor.

The shafts of gear wheels 6, 7, 8 and 9 are powered from a motor, not shown in drawing as it forms no part of the actual invention.

We claim:

1. A conveyor for handling frozen products comprising a plurality of alternately disposed stationary and vertically movable bars, vertical plates secured at both ends of said stationary bars, power transmission chain means having said plates secured thereto, driven gear wheel means driving said chain, vertical slots formed in said plates, guide means receiving the ends of said movable bars through said vertical slots, and multiple-lobe cam means mounted on the same shaft as the gear wheel means driving the power transmission chain and importing vertical reciprocating movement to said guide means.

2. A conveyor for handling frozen products according to claim 1, further comprising two spaced gear wheels about which the conveyor having moving bars and stationary bars moves, one of said wheels being disposed at the beginning of the freezer and the other one at its end, and a second conveyor parallel to and mounted beneath said conveyor having moving bars and stationary bars.

3. A conveyor for handling frozen products as according to claim 1, wherein said vertical slots are in the upper portions of said plates and the lower portions of said plates are fixed to articulated joints of said power transmission chain means.

4. A conveyor for handling frozen products according to claim 1, wherein said guide means comprises two vertically disposed, parallel beams, at least two horizontal straight line rods pivotally secured to the facing sides of said beams, and means on one of said beams defining a slot wherein said moving bars slide.